(12) United States Patent
Long et al.

(10) Patent No.: US 10,423,547 B2
(45) Date of Patent: *Sep. 24, 2019

(54) INITIALIZATION OF MODULAR DATA STORAGE ASSEMBLIES

(71) Applicant: Liqid Inc., Broomfield, CO (US)

(72) Inventors: Christopher R. Long, Colorado Springs, CO (US); Jason Breakstone, Broomfield, CO (US)

(73) Assignee: Liqid Inc., Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/029,815

(22) Filed: Jul. 9, 2018

(65) Prior Publication Data
US 2018/0314654 A1 Nov. 1, 2018

Related U.S. Application Data

(63) Continuation of application No. 15/139,609, filed on Apr. 27, 2016, now Pat. No. 10,019,388.
(Continued)

(51) Int. Cl.
*G06F 13/16* (2006.01)
*G06F 3/06* (2006.01)
(Continued)

(52) U.S. Cl.
CPC .......... *G06F 13/1668* (2013.01); *G06F 3/061* (2013.01); *G06F 3/0632* (2013.01);
(Continued)

(58) Field of Classification Search
None
See application file for complete search history.

(56) References Cited

U.S. PATENT DOCUMENTS 5,828,207 A 10/1998 Saadeh
6,061,750 A 5/2000 Beardsley et al.
(Continued)

OTHER PUBLICATIONS

Aragon, Juan L. et al., "Control Speculation for Energy-Efficient Next-Generation Superscalar Processors," IEEE Transactions on Computers, vol. 55, No. 3, pp. 281-291, Mar. 2006.
(Continued)

*Primary Examiner* — Michael Sun

(57) ABSTRACT

Systems, methods, apparatuses, and software for data storage systems are provided herein. In one example, a data storage platform includes data storage assemblies each comprising one or more storage drives that service data storage operations over associated storage interfaces. A control processor is coupled to ones of the data storage assemblies over at least two types of sideband communication interfaces different than the storage interfaces of the storage drives. During an initialization process for the one or more storage drives, the control processor configured to transfer initialization data to each of the data storage assemblies over a first type of sideband communication interface and transfer further initialization data to at least one of the data storage assemblies over a second type of sideband communication interface when the at least one of the data storage assemblies does not respond to the initialization data over the first type of sideband communication interface.

20 Claims, 5 Drawing Sheets

Related U.S. Application Data

(60) Provisional application No. 62/153,591, filed on Apr. 28, 2015, provisional application No. 62/153,584, filed on Apr. 28, 2015.

(51) Int. Cl.
  *G06F 13/42* (2006.01)
  *G06F 9/4401* (2018.01)
  *G06F 13/40* (2006.01)

(52) U.S. Cl.
  CPC .......... *G06F 3/0683* (2013.01); *G06F 9/4403* (2013.01); *G06F 13/4068* (2013.01); *G06F 13/4265* (2013.01); *G06F 13/4282* (2013.01)

(56) References Cited

U.S. PATENT DOCUMENTS

| | | | |
|---|---|---|---|
| 6,325,636 B1 | 12/2001 | Hipp et al. | |
| 7,243,145 B1 | 7/2007 | Poortman | |
| 7,260,487 B2 | 8/2007 | Brey et al. | |
| 7,505,889 B2 | 3/2009 | Salmonsen et al. | |
| 7,606,960 B2 | 10/2009 | Munguia | |
| 7,725,757 B2 | 5/2010 | Padweka et al. | |
| 7,877,542 B2 | 1/2011 | Chow et al. | |
| 8,125,919 B1 | 2/2012 | Khanka et al. | |
| 8,150,800 B2 | 4/2012 | Webman et al. | |
| 8,656,117 B1 | 2/2014 | Wong et al. | |
| 8,688,926 B2 | 4/2014 | Breakstone et al. | |
| 8,880,771 B2 | 11/2014 | Subramaniyan et al. | |
| 9,552,316 B2 | 1/2017 | Desimone et al. | |
| 9,602,437 B1 | 3/2017 | Bernath | |
| 2002/0059428 A1 | 5/2002 | Susai et al. | |
| 2003/0005200 A1* | 1/2003 | Kumar | G06F 9/4411 710/302 |
| 2003/0110423 A1 | 6/2003 | Helms et al. | |
| 2003/0126478 A1 | 7/2003 | Burns et al. | |
| 2005/0223136 A1 | 10/2005 | Tanaka et al. | |
| 2006/0277206 A1 | 12/2006 | Bailey et al. | |
| 2007/0067432 A1 | 3/2007 | Tarui et al. | |
| 2008/0034153 A1 | 2/2008 | Lee et al. | |
| 2008/0198744 A1 | 8/2008 | Menth | |
| 2008/0281938 A1 | 11/2008 | Rai et al. | |
| 2009/0006837 A1 | 1/2009 | Rothman et al. | |
| 2009/0100280 A1 | 4/2009 | Lindsay | |
| 2009/0190427 A1 | 7/2009 | Brittain et al. | |
| 2009/0193201 A1 | 7/2009 | Brittain et al. | |
| 2009/0193203 A1 | 7/2009 | Brittain et al. | |
| 2009/0276551 A1 | 11/2009 | Brown et al. | |
| 2010/0088467 A1 | 4/2010 | Lee et al. | |
| 2011/0289510 A1 | 11/2011 | Lin et al. | |
| 2011/0299317 A1 | 12/2011 | Shaeffer et al. | |
| 2011/0320861 A1 | 12/2011 | Bayer et al. | |
| 2012/0030544 A1 | 2/2012 | Fisher-Jeffes | |
| 2012/0089854 A1 | 4/2012 | Breakstone et al. | |
| 2012/0151118 A1 | 6/2012 | Flynn et al. | |
| 2012/0163174 A1* | 6/2012 | Shukla | H04L 49/357 370/235 |
| 2012/0166699 A1 | 6/2012 | Kumar et al. | |
| 2012/0210163 A1 | 8/2012 | Cho | |
| 2012/0317433 A1 | 12/2012 | Ellis et al. | |
| 2013/0132643 A1 | 5/2013 | Huang | |
| 2013/0185416 A1 | 7/2013 | Larkin et al. | |
| 2014/0047166 A1 | 2/2014 | Asnaashari et al. | |
| 2014/0056319 A1 | 2/2014 | Hellwig | |
| 2014/0059265 A1 | 2/2014 | Iyer et al. | |
| 2014/0075235 A1 | 3/2014 | Chandhoke et al. | |
| 2014/0103955 A1 | 4/2014 | Avritch et al. | |
| 2014/0108846 A1 | 4/2014 | Berke et al. | |
| 2014/0281071 A1* | 9/2014 | Xu | G06F 13/42 710/105 |
| 2014/0289574 A1* | 9/2014 | Tsern | G11C 29/50016 714/718 |
| 2014/0365714 A1 | 12/2014 | Sweere et al. | |
| 2015/0074322 A1 | 3/2015 | Galles | |
| 2015/0089110 A1* | 3/2015 | Harriman | G06F 13/4027 710/306 |
| 2015/0121115 A1 | 4/2015 | Chandra et al. | |
| 2015/0186437 A1 | 7/2015 | Molaro | |
| 2015/0212755 A1 | 7/2015 | Asnaashari | |
| 2015/0304423 A1 | 10/2015 | Satoyama et al. | |
| 2015/0370666 A1* | 12/2015 | Breakstone | G06F 3/0685 714/6.3 |
| 2015/0373115 A1 | 12/2015 | Breakstone et al. | |
| 2016/0197996 A1 | 7/2016 | Barton et al. | |
| 2016/0248631 A1 | 8/2016 | Duchesneau | |

OTHER PUBLICATIONS

International Application No. PCT/US2017/046602, International Search Report & Written Opinion, 8 pages, dated Oct. 19, 2017.
International Application No. PCT/US2017/046607, International Search Report & Written Opinion, 7 pages, dated Oct. 23, 2017.
Lu, Yingping et al., "Performance Study Of iSCSI-Based Storage Subsystems," IEEE Communications Magazine, pp. 76-82, Aug. 2003.

* cited by examiner

INITIALIZATION OF MODULAR DATA STORAGE ASSEMBLIES

RELATED APPLICATIONS

This application is a continuation of, and claims priority to, U.S. patent application Ser. No. 15/139,609, titled "ENHANCED INITIALIZATION FOR DATA STORAGE ASSEMBLIES," filed Apr. 27, 2016. This application also hereby claims the benefit of and priority to U.S. Provisional Patent Application 62/153,584, titled "FAULT-TOLERANT INITIALIZATION FOR DATA STORAGE ASSEMBLIES," filed Apr. 28, 2015, and to U.S. Provisional Patent Application 62/153,591, titled "AUTHENTICATION FOR INITIALIZATION OF DATA STORAGE ASSEMBLIES," filed Apr. 28, 2015, which are hereby incorporated by reference in their entirety.

BACKGROUND

Computer systems typically include bulk storage systems, such as magnetic disc drives, optical storage devices, tape drives, or solid state storage drives, among other storage systems. In these computer systems, a host system, such as a network device, server, or end-user computing device, communicates with external bulk storage systems to store data or to access previously stored data. These bulk storage systems are traditionally limited in the number of devices that can be included per host and also have large physical space requirements due to the separate physical packaging of individual storage drives, which can be problematic in storage environments where higher capacity, redundancy, and reliability is desired. These shortcomings can be especially pronounced with the increasing data storage and retrieval needs in networked, cloud, and enterprise environments. Moreover, when many data storage devices are employed in a system, such as in a rackmount environment, initialization of those data storage devices can be difficult.

OVERVIEW

Systems, methods, apparatuses, and software for data storage systems are provided herein. In one example, a data storage platform includes data storage assemblies each comprising one or more storage drives that service data storage operations over associated storage interfaces. A control processor is coupled to ones of the data storage assemblies over at least two types of sideband communication interfaces different than the storage interfaces of the storage drives. During an initialization process for the one or more storage drives, the control processor configured to transfer initialization data to each of the data storage assemblies over a first type of sideband communication interface and transfer further initialization data to at least one of the data storage assemblies over a second type of sideband communication interface when the at least one of the data storage assemblies does not respond to the initialization data over the first type of sideband communication interface.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

The various storage systems below each describe arrayed solid-state storage drive systems which include several different user-removable modules. A first type of module, a storage sled, includes solid state storage drives (SSDs) and are used to handle storage of data, among other operations. A second type of module, a processing module, handles user-facing network and storage interfaces that receive and transfer packet-based storage transactions. The processing modules also transfer and coordinate storage operations and associated data over a Peripheral Component Interconnect Express (PCIe) switch fabric which links the various storage sleds to the processing modules in a cluster-wide redundant and load-balancing configuration, among other operations. Further types of modules provide control, interworking, and intercommunication between processing modules and storage sleds, provides the PCIe switch fabric, and controls various initialization and control functions for the storage sleds, among other operations.

Figure 1:
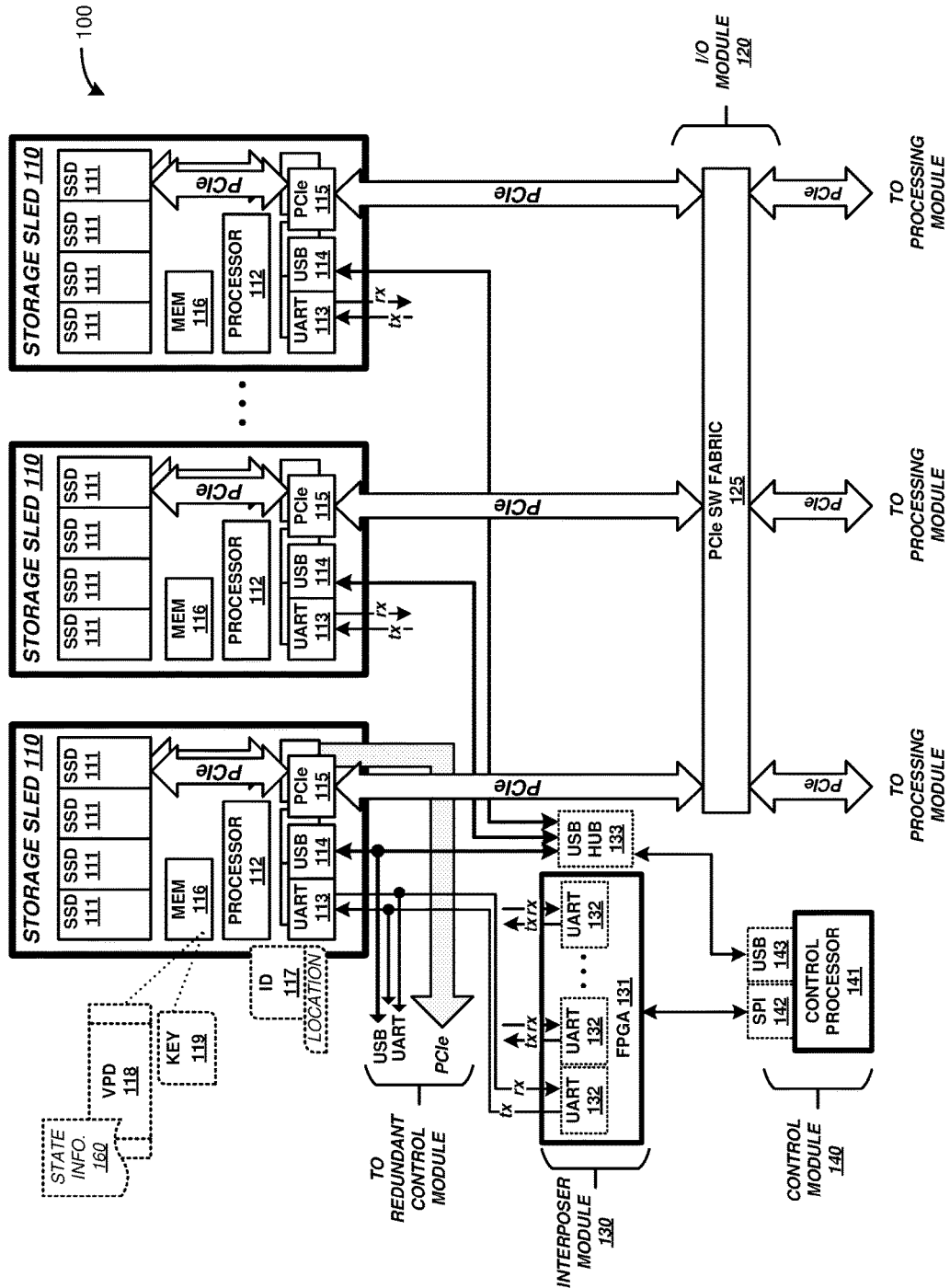
FIG. 1 is a diagram illustrating a storage system.
Figure 3:
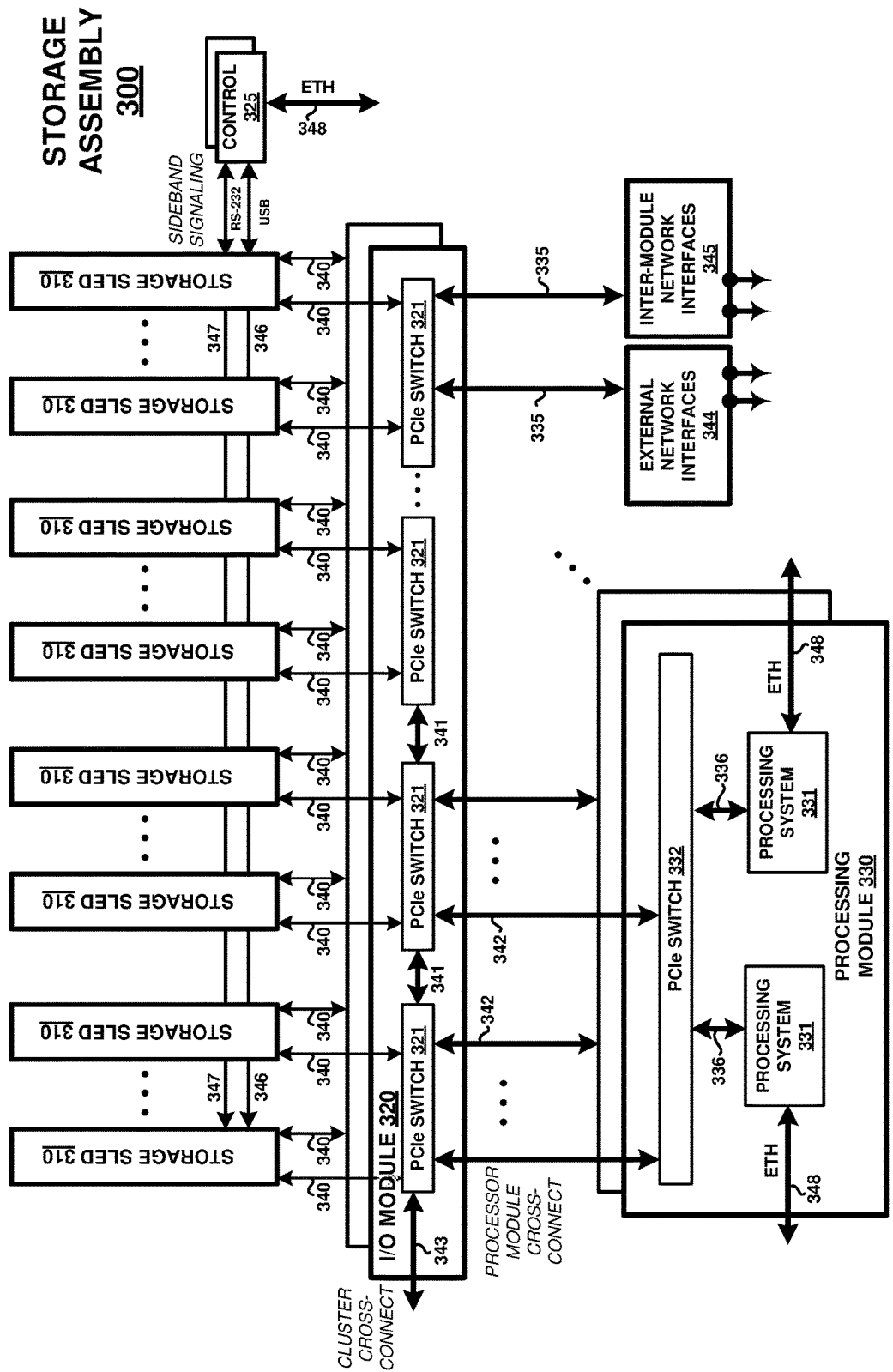
FIG. 3 is a diagram illustrating a storage system.

In a first example of a data storage system, FIG. 1 is provided. FIG. 1 is a system diagram illustrating storage system 100. Storage system 100 includes a plurality of storage sleds 110, I/O module 120, interposer module 130, and control module 140. Each storage sled 110 and I/O module 120 communicate over an associated PCIe interface, which can comprise a multi-lane PCIe interface, such as a x4 or x8 PCIe interface, among others. I/O module 120 provides a PCIe switch fabric for any of storage sleds 110 to communicate over PCIe interfaces with any of the processing modules not shown in FIG. 1. This PCIe fabric is used for transferring storage operations and associated storage data between processing modules and storage sleds. Further details on the processing modules and PCIe fabric are shown in FIG. 3.

In addition to the PCIe fabric for transferring storage operations and associated storage data, each storage sled 110 communicates over sideband communication interfaces for receiving command, control, and initialization communications. These sideband communication interfaces can include serial interfaces provided by a universal asynchronous receiver/transmitter (UART), Inter-Integrated Circuit (I2C) interfaces, Serial Peripheral Interfaces (SPI) busses, and Universal Serial Bus (USB) interfaces, although other sideband communication interfaces can be employed. Furthermore, a redundant I/O module is included in system 100 but not shown in FIG. 1 for clarity. Each storage sled 110 communicates with I/O module 120 as well as redundantly with another I/O module over the associated PCIe interfaces. Each storage sled 110 also communicates with redundant control modules over associated sideband interfaces.

Although the sideband interfaces for interposer module 130 and control module 140 are shown separately in FIG. 1, in other examples, the sideband elements can be located in the same modules or sleds. For example, the sideband communication elements for UART and USB interfaces along with processor 141 can be included in a separate circuit board along with other associated fan-out, replication and buffering circuitry, while the PCIe fabric circuitry can be included on I/O module 120.

Turning first to the elements of storage sled 110, each storage sled comprises several solid state drives (SSD) 111 which communicate over associated PCIe interfaces. Storage sleds 110 also include elements for handling storage and retrieval of data on an associated SSD 111 and transfer of the data over a common PCIe interface shared by each SSD 111. The elements of each storage sled 110 include processor 112, UART interface 113, USB interface 114, PCIe switch 115, and MEM 116.

Each SSD 111 comprises one or more SSD storage devices that store and retrieve data. Each SSD 111 can be comprised of one or more storage drives, such as individual flash memory drives, magnetoresistive solid state memory devices, or phase change memory devices, along with various host interfaces. Although SSD devices are discussed herein, other storage devices can be included, such as rotating magnetic hard drives. In FIG. 1, each of the SSD storage devices that comprise SSDs for a particular storage sled has an independent host interface comprising a PCIe interface. The PCIe interfaces for each of the SSD storage devices in each SSD 111 are coupled to PCIe switch 115 which acts as a crosspoint style switch for coupling multiple PCIe interfaces internal to the particular storage sled to the PCIe switch fabric associated with I/O module 120.

Processor 112 comprises one or more microprocessor devices along with associated computer-readable memory storage devices, such as RAM, flash memory, and the like, which store executable processing instructions to operate processor 112 as discussed herein. Processor 112 can comprise an ARM instruction set processor or Intel/x86 instruction set processor, although variations are possible. Processor 112 handles control functions for each associated storage sled, such as initialization, status monitoring, power monitoring, status reporting, operational tracking and logging, among other operations for the associated storage sled. Processor 112 interfaces to a further processor on one or more further modules through one or more sideband interfaces, such as UART interface 113 and USB interface 114.

UART interface 113 comprises a serial interface, such as an RS-232, RS-422, or RS-485 interface, which can include transmit and receive serial links, such as shown in FIG. 1. Other examples of UART interface 113 include bidirectional links or single-wire links. In FIG. 1, UART interface 113 includes one or more receiver (RX) links coupled to an associated receiver circuit which receive signals from UART interface 132 of FPGA 131. UART interface 113 includes one or more transmitter (TX) links coupled to associated transmitter circuit which transmit signals to UART interface 132 of FPGA 131. UART interface 113 can include specialized processing elements for handling traffic of the associated transmit/receive links, as well as associated computer-readable storage elements for holding firmware, identifiers, buffer data, among other data which can include executable instructions. UART interface 113 can be included in elements of processor 112 or can be included in discrete UART controller elements, including combinations thereof. Control processor 141 of control module 140 communicates with UARTs 132 in FPGA 131 over SPI interface 142. Communications of SPI interface 142 are converted into different serial communications by FPGA 131 and fanned out to more than one UART-based interface as seen in FIG. 1. Although UARTs 132 are implemented in FPGA 131 in FIG. 1, it should be understood that other implementations are possible, such as discrete circuitry, microcontrollers, microprocessors, specialized integrated circuits, among others.

In FIG. 1, each storage sled 110 is associated with identifier (ID) 117 which comprises a unique identifier for the associated storage sled. Each storage sled in FIG. 1 will include a different and unique identifier 117 which can be used by each UART interface 113 as an identity for communications directed over the associated RX link. In examples where sideband links, such as TX and RX links, are shared between more than one storage sled, ID 117 can be used to uniquely address the desired interface on the desired storage sled. Even when dedicated TX and RX links are used for each storage sled, ID 117 can allow for the associated UART interface to ignore unintentional or spurious traffic not addresses properly using the associated ID.

USB interface 114 comprises one or more USB client devices and communication transceivers including any associated processing elements which handle USB traffic over associated USB communication links. USB interface 114 can be included in elements of processor 112 or can be included in discrete USB controller elements, including combinations thereof.

PCIe switch 115 comprises one or more cross-point PCIe switches. PCIe switch 115 interfaces multiple PCIe links together into a PCIe fabric formed with associated PCIe elements of I/O module 120. In some examples, PCIe switch 115 comprises one or more PLX Technology PCIe switch chips, such as a PEX8725 10-port, 24 lane PCIe switch chip, or a PEX8796 24-port, 96 lane PCIe switch chip. Other PCIe switches can be employed.

Memory (MEM) 116 comprises one or more computer-readable memory storage devices. Various non-volatile memory types can be employed, which comprise non-volatile computer-readable media, such as flash memory, magnetoresistive RAM, phase change memory, Programmable Read-Only Memory (PROM), Electronically-Erasable Programmable Read-Only Memory (EEPROM), or other non-volatile computer-readable memory.

In FIG. 1, each MEM 116 contains vendor product data (VPD) 118 and key 119. Key 119 comprises a unique identifier which is stored in a predetermined location within MEM 116 and is used by processor 141 to verify an authenticity of the associated storage sled. Processor 141 can be configured to locate key 119 on each storage sled and verify key 119 to establish that storage sled is authentic and authorized as a storage sled for use in system 100. If key 119 is not present in MEM 116 or invalid, then the associated storage sled can be prevented from participating in initialization into system 100 or for storage operations therewith. The specific location of key 119 within MEM 116 is known by processor 141 and is generally kept secret from other external systems, such as end users, manufacturers, or operators of system 100. In some examples, key 119 comprises an encryption key which is used in a decryption process or public-private key validation scheme to ensure that the associated storage sled 110 is authentic. For example, key 119 can comprise a 128-bit ID which is used to validate any associated storage sled 110 using a public-private encryption key scheme.

VPD 118 includes various information for an I2C interface or for UART interface 113, such as product identity data, model numbers, serial numbers, part numbers, versioning information, feature support, and the like. In addition, a scratchpad area is established within VPD 118 which contains operational state information and current status information for the associated storage sled, as indicated by state information 160 in FIG. 1. This state information can include currently logged error status for elements of the associated storage sled, such as error status for elements 111-116. This information can be retrieved by processor 141 over the associated UART interface or USB interface.

Turning now of the elements of control module 140, this module includes control processor 141, SPI interface 142, and USB interface 143. Control processor 141 comprises one or more microprocessor devices along with associated computer-readable memory storage devices, such as RAM, flash memory, and the like, which store executable processing instructions to operate control processor 141 as discussed herein. Control processor 141 can comprise an ARM instruction set processor or Intel/x86 instruction set processor, although variations are possible. Control processor 141 handles various control functions in storage system 100, such as initialization, status monitoring, power monitoring, status reporting, operational tracking and logging, among other operations. Control processor 141 interfaces to a further processor on one or more storage sleds through one or more sideband interfaces, such as SPI interface 142 and USB interface 143.

In examples such as shown in FIG. 1 where a separate module is employed for aiding sideband communications, an intermediary interface can be employed between processor 141 and UART interfaces 132. An I2C or SPI interface can be employed between processor 141 and UART interfaces 132, among other intermediary interfaces. Additionally, each UART link can be fanned out as point-to-point links to each storage sled through a separate fan-out circuit or Field-Programmable Gate Array (FPGA) with a single link between processor 141 and the separate circuit.

The UART interfaces 132 and 113 each comprise one or more serial interfaces, which can include individual transmit and receive links, such as shown in FIG. 1. Other examples of UART interfaces include bidirectional links or single-wire links. In FIG. 1, the UART interfaces include one or more receiver (RX) links coupled to an associated receiver circuit which receive signals from an associated storage sled or from other processors on redundant modules. The UART interfaces includes one or more transmitter (TX) links coupled to associated transmitter circuit which transmit signals to an associated storage sled or to other processors on redundant modules. The UART interfaces can include specialized processing elements for handling traffic of the associated UART transmit/receive links, as well as associated computer-readable storage elements for holding firmware, identifiers, buffer data, among other data which can include executable instructions. The UART interfaces can be included in elements of processor 141 or FPGA 131 or can be included in discrete UART controller elements, including combinations thereof. Also, although UART interfaces 132 and 113 are shown in FIG. 1, in other examples, I2C interfaces can be employed.

USB interface 143 comprises one or more USB host controllers and communication transceivers including any associated processing elements which handle USB traffic over associated USB communication links. In some examples, USB interface 143 comprises a Universal Host Controller Interface (UHCI), Open Host Controller Interface (OHCI), Enhanced Host Controller Interface (EHCI), or Extensible Host Controller Interface (XHCI), including variations, combinations, and improvements thereof. USB interface 143 can be included in elements of processor 141 or can be included in discrete USB controller elements, including combinations thereof. USB hub equipment 133 can be employed to fan-out each USB interface/link for USB interfaces 114, such as when a separate interposer module is employed. USB hub equipment 133 can include one or more USB hubs.

PCIe switch 115 comprises one or more cross-point PCIe switches. PCIe switch 115 interfaces multiple PCIe links together into a PCIe fabric formed with associated PCIe elements of I/O module 120. In some examples, PCIe switch 115 comprises one or more PLX Technology PCIe switch chips, such as a PEX8725 10-port, 24 lane PCIe switch chip, or a PEX8796 24-port, 96 lane PCIe switch chip. Other PCIe switches can be employed.

PCIe switch fabric 125 comprises one or more cross-point PCIe switches. PCIe switch 125 interfaces multiple PCIe links together into a PCIe fabric formed with associated PCIe elements of I/O module 120. In some examples, PCIe switch 125 comprises one or more PLX Technology PCIe switch chips, such as a PEX8725 10-port, 24 lane PCIe switch chip, or a PEX8796 24-port, 96 lane PCIe switch chip. Other PCIe switches can be employed.

Figure 2:
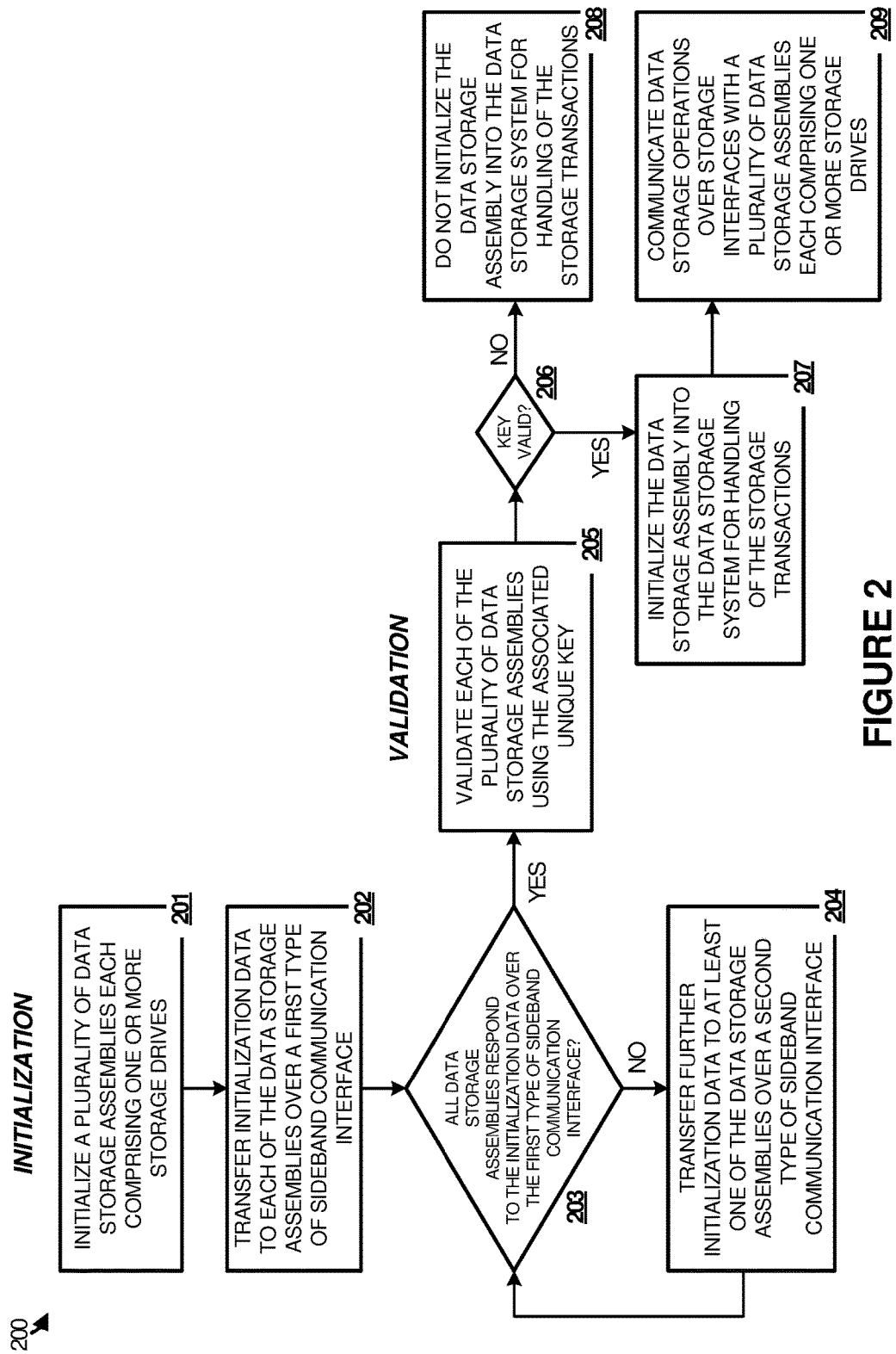
FIG. 2 is a flow diagram illustrating example operation of a storage system.

To illustrate further operation of the elements of FIG. 1, FIG. 2 is presented. FIG. 2 is a flow diagram illustrating example operation of system 100. The operations of FIG. 2 are indicated below parenthetically. During operation, the switch fabric provided by PCIe switch fabric 125 and PCIe switches 115 allow for any storage operation received by a processing module to be routed to any storage sled 110. Likewise, any data transferred by any storage sled 110 can be directed to any processing module through the switch fabric. Typically, a storage sled will have a particular address range or logical unit associated therewith, but storage operations can be received by any processing module over an associated network or storage interface. Thus, a processing module can transfer storage operations over a common PCIe switch fabric to an appropriate processing module or appropriate storage sled.

However, before storage operations can be handled by system 100, an initialization process is performed with each storage sled. In this example, control processor 141 initializes (201) a plurality of data storage assemblies each comprising one or more storage drives, namely storage sleds 110 and SSDs 111. This initialization process ensures that each storage sled 110 is detected and validated. This initialization process, as detailed below, can ensure that the initialization interfaces have redundancies and fault tolerance. Initialization of the storage sleds is performed using processor 141 and a variety of sideband communication interfaces, namely UART interfaces and USB interfaces. In some examples, processor 141 communicates over SPI interface 142 with interposer module 130 which then interconverts and fans-out the SPI interface into the plurality of UART interfaces seen in FIG. 1. In other examples, processor 141 communicates with storage sleds over one or more serial interfaces without interposer module 130.

Control processor 141 transfers (202) initialization data to storage sleds 110 over a first type of sideband communication interface. This first type of sideband interface comprises the UART interfaces 132 in FIG. 1. During initialization, processor 141 transfers an initialization message to each storage sled 110 over the associated TX link of UART interface 132 using SPI interface 142 and interposer module 130. The associated storage sled 110 can receive this initialization message over UART interface 113. In some examples, an UART interface is shared among many devices which branch off of a common bus or link. To provide for unique identification and response by each UART device, an identifier is used, such as ID 117 shown in FIG. 1. However, in FIG. 1 an individually fanned-out topology is employed, and a single storage sled is coupled to processor 141 over a matching interface. The ID is still employed in this point-to-point configuration to at least qualify communications as being associated with a particular sled. Additionally, a location identifier can be included in the initialization message which corresponds to a physical location of the associated storage sled in an enclosure. The physical location identifier can be predetermined for each slot or bay that a storage sled fits into and can be set via general purpose pins, jumpers, or by a configuration of a connector that the storage sled plugs into, which can physically encode a pin or pins to a predetermined value upon insertion. In some examples, the physical location identifier comprises a lower-order or higher-order portion of the ID, such as a lower-order 4 bits of a 7 bit address/ID. In other examples, a separate physical location identifier is employed in addition to the ID. A cyclic redundancy check (CRC) can be established for the initialization message or parts of the initialization message, such as a CRC-5.

Control processor 141 determines if each sled 110 responds to the initialization data over the first type of sideband communication interface (203). If a storage sled receives over an associated TX line an initialization message that matches both an ID and physical location identifier, then the storage sled will transfer a response message to processor 141. However, in some cases an initialization message is received by a storage sled but the response message is either not transferred by the storage sled or is not received by processor 141. This can occur when a storage sled is malfunctioning or when a link that carries the response message is malfunctioning, among other malfunctions. Additionally, when a storage sled is missing, not installed correctly, or uninstalled, a response message might not be transferred to processor 141.

Processor 141 has a timeout routine which waits for a response message from each storage sled that an initialization message is sent to, where the timeout period can be variable based on the desired speed of the initialization process along with typical response speeds in properly working systems. If a timeout routine waits for longer than a timeout threshold for an associated storage sled, then a secondary initialization process is performed for the associated storage sled.

In the secondary initialization process, control processor 141 transfers (204) further initialization data to at least one of storage sleds 110 over a second type of sideband communication interface. Control processor 141 transfers the further initialization data to ones of storage sleds 110 that fail to respond to the first initialization data over the first type of sideband communication interface. One or more retries employing the first type of sideband communication interface can be first performed by control processor 141 before switching to the second type of sideband communication interface for the storage sleds that fail to respond over the first type of sideband communication interface.

The secondary initialization process transfers the initialization message to the associated storage sled over a USB interface, such as USB interface 143/114. Processor 112 can receive the secondary initialization message over USB interface 114 and determine a response to processor 141. This response can indicate that the original initialization message was received over the UART interface and a status of the response message. In some examples, the response message was transferred by processor 112 and then processor 112 indicates that the response was already sent over the UART in a response message over USB interface 114 to processor 141. In the instance where the response message was transferred over UART and never received by processor 141, processor 141 can determine that a portion of the serial UART link between processor 141 and the associated storage sled is faulty, such as an RX portion in FIG. 1. If the response message was not sent over UART by the associated storage sled, then processor 141 can determine that a different portion of the serial UART link between processor 141 and the associated storage sled is faulty, such as a TX portion in FIG. 1. Other diagnostic results are possible from the combination of which initialization messages were received/transferred by the associated storage sled.

In storage systems with redundant control modules or interposer modules, a secondary UART interface can be employed when the first UART interface is faulty. For example, a second processor 141 on a second control module 140 can issue the initialization message over an associated UART link, such as shown in the "redundant control module" links of FIG. 1. This redundant process can occur only during a fault condition of the first control module, or can occur in parallel with two or more control modules sending initialization messages concurrently.

Once a portion of an UART link or interface is determined to be faulty, then that portion of the UART interface can remain disabled for a period of time, such as during the current power cycle. Various in-situ repair processes can occur, such as resetting UART circuitry elements, power-cycling various UART elements, resetting/power-cycling the associated storage sled, or other processes to attempt to obtain an operational state of the UART links. If the UART interface cannot be restored, then the USB link can remain as the primary link for sideband and initialization communication between the associated storage sled and processor 141. Properly working storage sleds can remain using UART communications when one or more storage sleds have faulty UART interfaces.

If a storage sled properly receives the initialization message and processor 141 eventually receives a response message (either via UART or USB), then further initialization processes can occur. For example, the various SSD drives 111 can be powered-up and initialized, among other various elements of storage sled 110. Furthermore, each storage sled 110 can be validated to be a valid or acceptable storage sled using one or more unique keys, as will be discussed below.

Various logs or state information 160 can be stored in MEM 116, such as fault states, statistical data, or usage information, which can be obtained by processor 141 over a sideband interface and used in reporting to a user or troubleshooting performed by processor 141. State information 160 is included in a scratchpad area of the volatile product data (VPD) 118 area of MEM 116. State information 160 can be organized into a data structure, such as a database, table, encoded representation, compressed format, or other formats, including combinations thereof. In some examples, VPD 118 has a scratchpad area but that area is not large enough for state information 160. This scratchpad area can be increased in size, such as to 2 kilobits, to accommodate state information 160. State information 160 can have a CRC applied thereto or be encoded by an encryption process.

Additionally, each storage sled 110 is serialized by a unique identifier shown as key 119 in FIG. 1. Control processor 141 validates (205) each of storage sleds 110 using the associated unique key. This key can comprise a unique identifier which is long enough to serialize an entire production run of storage sleds, such as a 128-bit identifier. During an initialization process (206), any storage sled 110 that does not report the correct key 119 to processor 141, can be determined to be faulty or counterfeit and placed into a disabled state. This validation process can ensure that only selected storage sleds can be installed into system 100. The location within MEM 116 of key 119 can be kept secret and known only to software or firmware installed on processor 141. Thus, when a new storage sled is inserted, it can be validated using key 119 before any user data is transferred for storage thereon, preventing unwanted data corruption or data monitoring.

Thus, during an initialization process for each storage sled, control processor 141 is configured to validate each storage sled using an associated unique key 119 for each storage sled. When a storage sled is invalid based on the associated unique key, then control processor 141 is configured to withhold initialization (208) of that storage sled into the data storage system for handling of the storage transactions. When a storage sled is valid based on the associated unique key, then control processor 141 is configured to initialize (207) that storage sled into the data storage system for handling of the storage transactions.

Once the initialization process is complete, then data storage system 100 communicates (209) data storage operations over storage interfaces, such as PCIe fabric 125, with SSDs 111 on storage sleds 110. The switch fabric provided by PCIe switch fabric 125 and PCIe switches 115 allow for any storage operation received by a processing module to be routed to any storage sled 110. The processing modules typically include those connected to the storage sleds over the PCIe fabric, such as detailed for processing modules 330 in FIG. 3. Likewise, any data transferred by any storage sled 110 can be directed to any of the fabric-connected processing module through the switch fabric.

FIG. 3 is a system diagram illustrating storage assembly 300. Storage assembly 300 includes several different module types in FIG. 3, namely storage sleds 310, input/output (I/O) modules 320, control module 325, and processing modules 330. In this example, many storage sleds, at least two I/O modules, at least two control modules, and at least two processing modules are included. However, it should be understood that any number of storage sleds 310, I/O modules 320, control modules 325, and processing modules 330 can be included, such as 72 storage sleds, 2 I/O modules, 2 control modules, and 8 processing modules. Additionally, power supply modules, fans, and associated power and control distribution links can also be included, but are omitted in FIG. 3 for clarity.

A module typically comprises physical support structure and enclosure that includes circuitry, printed circuit boards, semiconductor systems, and structural elements. The modules are insertable and removable from a rackmount style of enclosure. In some examples, the elements of FIG. 3 are included in a unit chassis for mounting in a larger rackmount environment. It should be understood that the elements of FIG. 3 can be included in any physical mounting environment, and need not include any associated enclosures or rackmount elements.

A plurality of storage sleds 310 are included in system 300. Each storage sled 310 includes one or more storage drives, such as four in some examples. Each storage sled 310 also includes Peripheral Component Interconnect Express (PCIe) switches, processors, and control system elements. PCIe switches of each storage sled 310 communicate with one or more on-sled storage drives over associated PCIe links. PCIe switches of each storage sled 310 also are communicatively coupled to an on-sled processor or control system for traffic statistics retrieval and status monitoring, among other operations. PCIe switches of each storage sled 310 communicate over one or more PCIe links 340 with an associated PCIe switch 321 of an I/O module 320.

PCIe switches 321 of I/O modules 320 form a PCIe fabric which is used for the transfer of storage operations and control instructions between storage sleds, processing modules, and network interfaces. Each PCIe switch 321 is cross-connected with one or more PCIe switch 321 over PCIe fabric links 341. Each PCIe switch 321 of I/O modules 320 communicate over associated PCIe links 342 with associated PCIe switch 332 of one or more processing modules 330. PCIe switch 332 communicates with one or more associated processing systems 331. I/O modules 320 also each use PCIe switches 321 for interconnecting processor modules, such as processor modules 330. PCIe switches 321 are employed for this processor module cross-connect, and communicate with ones of PCIe switches 321 in associated processing modules 330 over processor module cross-connect links 342. PCIe switch 332 communicates with ones of processing systems 331 over PCIe links 336. PCIe switches 321 can also each include unit/cluster cross-connect links 343, which are used to expand the PCIe fabric to other physical unit/cluster enclosures.

In the example in FIG. 3, PCIe switches 321 and 332 (and associated PCIe links) include a back end data plane of system 300 used for carrying user data between storage sleds 310 and processing modules 330. PCIe switches 321 and 332 (and associated PCIe links) also include a front end data plane of system 300 used for carrying user data and signaling between processing modules and externally-facing network interfaces.

Control module 325 includes one or more microprocessors or microcontrollers along with any associated storage memory. Control module 325 communicates with processing modules over Ethernet control plane links 348. Control module 325 communicates with data storage sleds over sideband links 346 and 347 which can comprise USB links or UART serial links (such as RS-232 links), among others.

Control module 325 initializes data storage sleds 310 as discusses above in FIG. 1. Control module 325 also accumulates statistical data and usage information for each storage sled 310 in storage assembly 300. Control module 325 can retrieve this statistical data or usage information over Ethernet links 348 from processing modules 330 or over USB sideband and UART sideband links 346 from data storage sleds 310. Although one Ethernet link 348 is shown in FIG. 3, this link represents many links which individually couple to each processing system in each processing module of assembly 300. Ethernet links 348 comprise a control plane, which can be used for transferring control information and status information between processing modules. I/O module 320 also provides expansion of the control plane to other unit enclosures for cluster control plane interconnect over Ethernet links.

Each processing module 330 communicates over one or more PCIe links 336 through PCIe switch 332 with external expansion cards or external PCIe ports. In some examples, the external network expansion cards include network interface cards for communicating over TCP/IP (Transmission Control Protocol (TCP)/Internet Protocol) networks or for carrying iSCSI (Internet Small Computer System Interface) or NVMe (NVM Express) traffic. These external network links are illustrated by external network interfaces 344.

External access to storage assembly 300 is provided over ones of packet network links provided by external network interfaces 344, such as for end user access to data stored on storage sleds 310.

Each processing module 330 can also communicate with other processing modules, such as those in other storage assemblies, over one or more inter-module packet network interfaces 345. In some examples, module packet network interfaces 345 include network interface cards for communicating over Ethernet or TCP/IP (Transmission Control Protocol (TCP)/Internet Protocol) networks for exchanging storage packets between processing modules. Further operation of inter-module storage packet exchange over Ethernet is discussed in the examples below.

The PCIe switches discussed herein can comprise PCIe crosspoint switches, which logically interconnect various ones of the associated PCIe links based at least on the traffic carried by each PCIe link. In some examples, logical segregation of the PCIe fabric is achieved using non-transparent ports of the PCIe switches. Each PCIe switch port can be a non-transparent (NT) or transparent port. An NT port can allow some logical isolation between endpoints, much like a bridge, while a transparent port does not allow logical isolation, and has the effect of connecting endpoints in a purely switched configuration. Access over an NT port or ports can include additional handshaking between the PCIe switch and the initiating endpoint to select a particular NT port or to allow visibility through the NT port.

In other examples, logical segregation of the PCIe fabric is achieved using domain-based routing of the PCIe switches. A domain-based PCIe signaling distribution can be included in the PCIe switches which allows segregation of PCIe ports of a PCIe switch according to user-defined groups. These logical segregation or groups can be used to form the front-end and back-end data planes discussed herein, or can be used for establishing routing and redundancy among the various PCIe switches, forming a mesh fabric of PCIe traffic in system 300.

PCIe can support multiple bus widths, such as x1, x4, x8, x16, and x32, with each multiple of bus width comprising an additional "lane" for data transfer. PCIe also supports transfer of sideband signaling, such as System Management Bus (SMBus) interfaces and Joint Test Action Group (JTAG) interfaces, as well as associated clocks, power, and bootstrapping, among other signaling. Although PCIe is used in FIG. 3, it should be understood that different communication links or busses can instead be employed, such as NVMe, Ethernet, Serial Attached SCSI (SAS), FibreChannel, Thunderbolt, Serial Attached ATA Express (SATA Express), among other interconnect, network, and link interfaces. Any of the links in FIG. 3 can each use various communication media, such as air, space, metal, optical fiber, or some other signal propagation path, including combinations thereof. Any of the links in FIG. 3 can include any number of PCIe links or lane configurations. Any of the links in FIG. 3 can each be a direct link or might include various equipment, intermediate components, systems, and networks. Any of the links in FIG. 3 can each be a common link, shared link, aggregated link, or may be comprised of discrete, separate links.

In FIG. 3, any processing system 331 on any processing module 330 has logical visibility to all storage drives 311 in all storage sleds 310 over the PCIe fabric. Any processing system 331 can transfer data for storage on any storage drive 311 and retrieve data already stored on any storage drive 311. Thus, 'm' number of storage drives can be coupled with 'n' number of processors to allow for a large, scalable architecture with a high-level of redundancy and density.

To provide visibility of each processing system 331 to any storage sled 310, various techniques can be employed. In a first example, a particular processing system 331 manages (instantiates/binds) a subset number of the total quantity of storage sleds, such as 16 storage drives spanning 4 storage sleds, and handles transactions for that subset of storage drives, such as read and write transactions. Each processing system 331, however, has memory-mapped or routing-table based visibility to the storage drives managed by any other processing system 331 or processing systems in other storage assemblies. When a storage operation is desired for a storage drive not managed by a particular processing system, the particular processing system uses the memory mapped access or routing-table based visibility to direct the storage operation to the proper storage drive for that transaction. The transaction can be transferred and transitioned to the appropriate processing system that manages that storage drive associated with the data of the transaction. The front end PCIe data plane, through PCIe switches 321, or inter-module network interfaces 345 are used to transfer data between processing systems so that a particular processing system or processor can store the data in the storage sled or sleds that is managed by that particular processing system, even though the data might be received over a network interface associated with a different processing system.

In operation, such as a write operation, data can be received over portions of external network interfaces 344 by any processing system 331 of any processing module 330. For example, the write operation can be a write operation received over external network interfaces 344 from an end user employing an iSCSI protocol or NVMe protocol. The processing system that receives the write operation determines if it physically manages the storage drive or drives associated with the write operation, and if it does, then the processing system transfers the data for storage on the associated storage drives over a back end data plane of the PCIe fabric. If the processing system determines that it does not physically manage the storage drive or drives associated with the write operation, then the processing system transfers the write operation to another processing module that includes the processing system that does manage the storage drive or drives over either the front end PCIe data plane or over inter-module network interfaces 345. Data striping can be employed by any processing system to stripe data for a particular write transaction over any number of storage drives, such as over all of the storage sleds that include storage drives managed by the particular processing system.

In this example, the PCIe interfaces associated with each processing system 331 have 64-bit address spaces, which allows an addressable space of $2^{64}$ bytes, leading to at least 16 exbibytes of byte-addressable memory. The 64-bit PCIe address space can shared by all processing systems 331 for memory mapping to storage drives on storage sleds. Thus, while each particular processing system 331 actually manages a subset of the total storage drives on storage sleds, all processors 331 have visibility to, and can initiate read/write transactions to, any of storage drives on storage sleds. A managing processing system 331 that manages a particular storage drives on storage sleds receives write/read transactions and any associated data from an initiating processing system 331 by at least using a memory-mapped address space or routing table to establish which processing module handles storage operations for a particular set of storage sleds.

Figure 4:
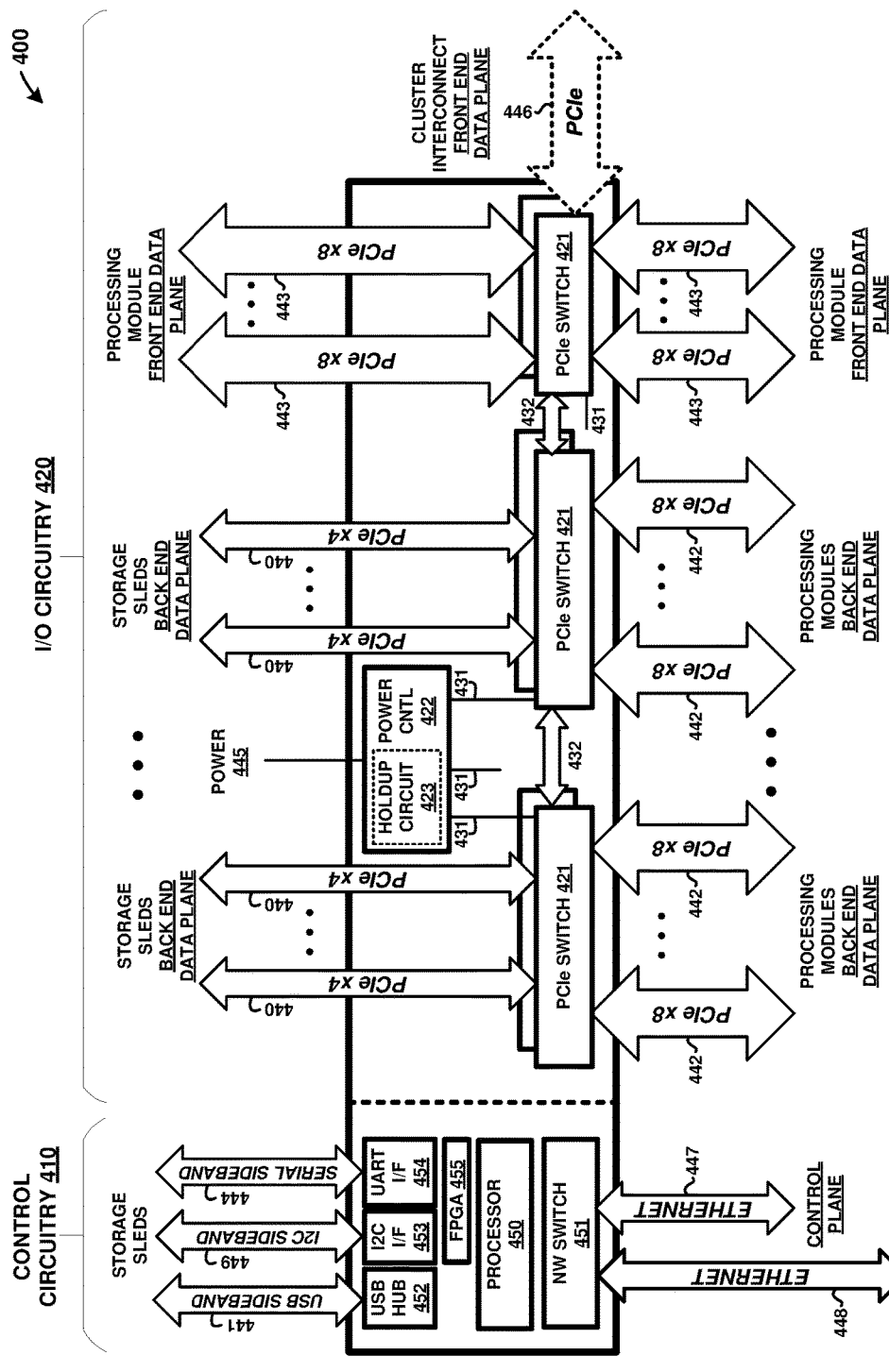
FIG. 4 is a diagram illustrating a storage system.

FIG. 4 is a block diagram illustrating separate control and interconnect circuitry in system 400. System 400 can comprise a single control module or control board, or can include one or more I/O modules, control modules, and interposer modules. For example, system 400 can include elements from I/O module 120, interposer module 130, or control module 140 of FIG. 1 or I/O modules 320 of FIG. 3, although variations are possible.

Control circuitry 410 includes processor 450, network switch 451, USB hub 452, I2C interface 453, UART interface 454, and FPGA 455. In some examples, I2C interface 453 is omitted. Network switch 451 can include one or more Ethernet switches, bridges, or routers, including transceivers, impedance matching transformers, isolation circuitry, buffers, and the like. USB hub 452 includes USB hub circuitry for fanning out a single host USB connection to many device USB links 441, and can include transceivers, processors, transformers, isolation circuitry, buffers, and the like. FPGA 455 includes various communication and protocol conversion and fan-out circuitry, such as for interworking communications of processor 450 over any of I2C links 449 and UART links 444.

Processor 450 includes one or more microprocessors or microcontrollers along with any associated storage memory. Processor 450 communicates with processing modules, such as modules 330 of FIG. 3, over Ethernet control plane links 447 and 448. Processor 450 communicates with data storage sleds over sideband links 441, 444, and 449 which can comprise USB links, I2C links, or UART links, among others. Processor 450 initializes data storage sleds, such as discussed above for FIG. 1. Processor 450 accumulates statistical data and usage information for each storage sled in a storage system. Processing modules can retrieve this statistical data or usage information from processor 450 over Ethernet link 447 via network switch 451 from processing modules or over USB, I2C, or UART sideband links from data storage sleds by way of processor 450. Ethernet link 447 comprises a control plane, which can be used for transferring control information and status information between processing modules. I/O circuitry 420 also provides expansion of the control plane to other unit enclosures for cluster control plane interconnect over Ethernet link 448.

I/O circuitry 420 includes at least three back end data plane PCIe switches 421, at least two front end data plane PCIe switches 424, power control module 422, and holdup circuit 423. Power control module 422 distributes power to each element of I/O circuitry 420 over associated power links 431. Power control module 422 can selectively enable/disable power for each power link. Further communication links can be included for intra-sled communication between the various elements of control circuitry 410 and I/O circuitry 420.

PCIe switches 421, PCIe links 441, and PCIe links 442 are included in a back end data plane of a storage system. Each PCIe switch 421 communicates with two or more storage sleds (not pictured) over PCIe links 440, and with two or more processing modules (not pictured) over PCIe links 442. Each of links 440 comprises a PCIe link with four lanes, namely a "x4" PCIe link. Each of links 442 comprises a PCIe link with eight lanes, namely a "x8" PCIe link. In some examples, each PCIe switch 421 communicates with one or more processing modules. Each PCIe link can also include sideband signaling, such as SMBus, JTAG, I2C, CAN, or any other communication interface, and in some examples is provided over separate links. Each PCIe switch 421 comprises a PCIe cross connect switch for establishing switched connections between any PCIe interface handled by each PCIe switch 421. In some examples, each PCIe switch 421 comprises a PLX Technology PEX8796 24-port, 96 lane PCIe switch chip.

PCIe switches 421 and PCIe links 443 are included in a front end data plane of a storage system. PCIe switches 421 communicate with many processing modules over PCIe links 443, and with each other over PCIe links 432. Each of links 443 comprise a PCIe link with eight lanes, namely a "x8" PCIe link. In some examples, each PCIe switch 421 communicates with one or more processing modules. Each PCIe link can also include sideband signaling, such as SMBus, JTAG, I2C, CAN, or any other communication interface, and in some examples is provided over separate links. Each PCIe switch 421 comprises a PCIe cross connect switch for establishing a PCIe fabric using a plurality of switched connections between any PCIe interface handled by each PCIe switch 421. In some examples, each PCIe switch 424 comprises a PLX Technology PEX8796 24-port, 96 lane PCIe switch chip.

Power control module 422 includes circuitry to selectively provide power to any of the elements of I/O circuitry 420. Power control module 422 can receive control instructions from a processing module over PCIe links or Ethernet links 447. Power control module 422 can receive power over power link 445 as a power source for the various elements of I/O circuitry 420. Holdup circuit 423 includes energy storage devices for storing power received over power link 445 for use during power interruption events, such as loss of source power. Holdup circuit 423 can include capacitance storage devices, such as an array of capacitors.

PCIe switches 421 can include cluster interconnect interfaces 446 which are employed to interconnect further I/O modules of other storage systems. Interfaces 446 comprise PCIe links with 16 lanes, namely "x16" PCIe links. Cluster interconnect provides PCIe interconnect between external systems, such as other storage systems, over associated external connectors and external cabling. These connections can be PCIe links provided by any of the include PCIe switches, among other PCIe switches not shown, for interconnecting other I/O modules of other storage systems via PCIe links. The PCIe links used for cluster interconnect can terminate at external connectors.

Figure 5:
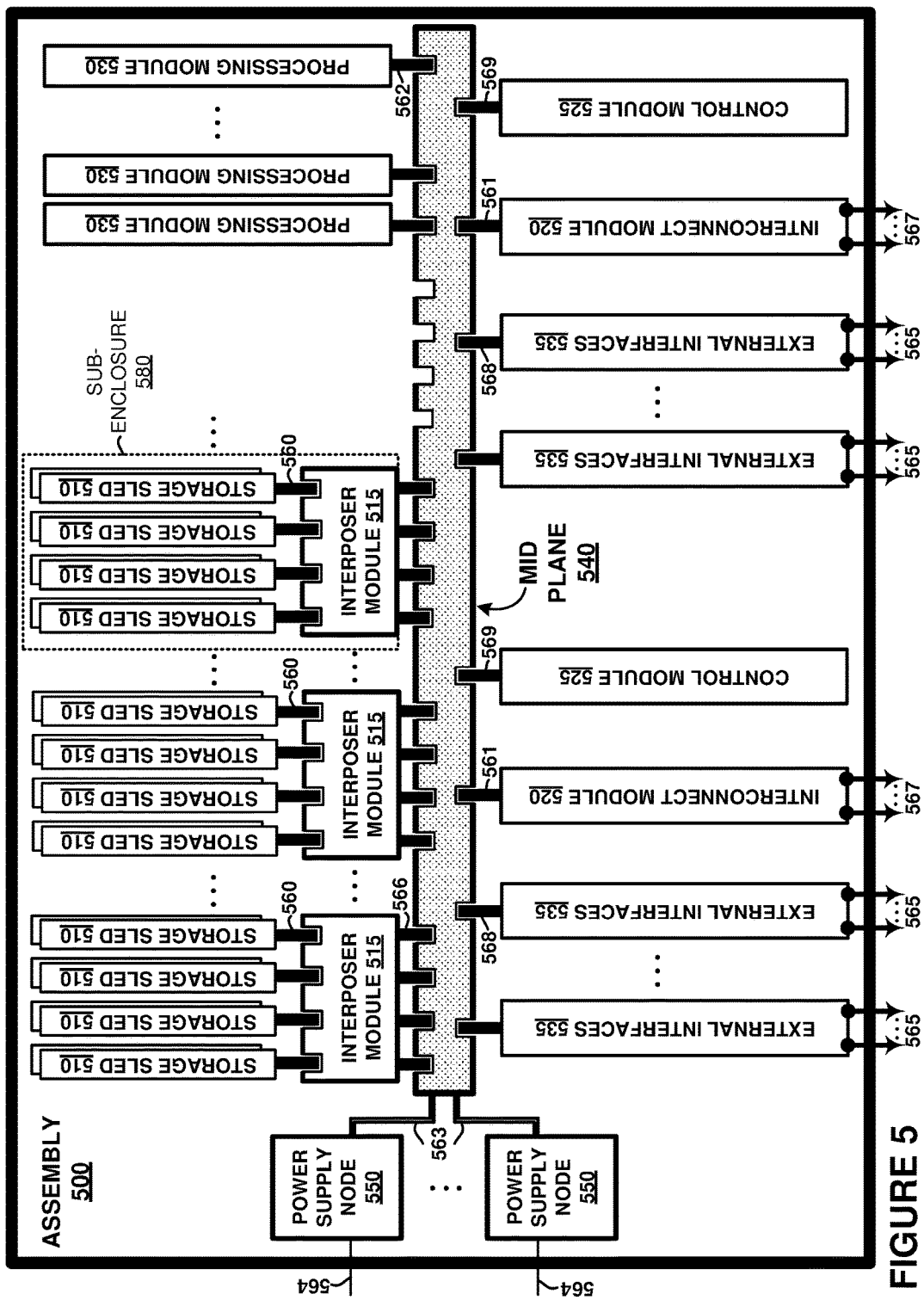
FIG. 5 is a diagram illustrating a storage system.

FIG. 5 is a block diagram illustrating a storage system. The elements of FIG. 5 are shown as physically mated to midplane 540. Midplane 540 includes a chassis and a plurality of physical connectors for mating with any associated storage sleds 510, interposer modules 515, interconnect modules 520, control modules 525, processing modules 530, or external interfaces 535. Midplane 540 comprises one or more printed circuit boards, connectors, physical support members, chassis elements, structural elements, and associated links as metallic traces or optical links for interconnecting the various elements of FIG. 5. Midplane 540 can function as a backplane, but instead of having sleds or modules mate on only one side as in single-sided backplane examples, midplane 540 has sleds or modules that mate on at least two sides. Elements of FIG. 5 can correspond to similar elements of FIGS. 1-3, although variations are possible.

FIG. 5 shows all elements included in a unit enclosure 500. The enclosure can instead be of any multiple of a standardized computer rack height, such as 1U, 2U, 3U, 4U, and the like, and can include associated chassis, physical supports, cooling systems, mounting features, cases, and other enclosure elements. Typically, each sled or module will fit into associated groove features included in a chassis portion of enclosure 500 to slide into a predetermined slot and guide an edge connector associated with each sled to mate with an associated socket connector on midplane 540. Enclosure 500 enables hot-swapping of any of the modules or sleds and can include other features such as power lights, activity indicators, external administration interfaces, and the like.

Storage sleds 510 each have an associated connector 560 which mates into a mating connector of an associated interposer module 515. Each interposer module 515 has associated connectors 566 which mate with one or more connectors on midplane 540. In this examples, up to eight storage sleds 510 can be inserted into a single interposer module 515 which subsequently mates to a plurality of connectors on midplane 540. These connectors can be a common or shared style/type which is used by processing modules 530 and connector 562. Additionally, each collection of storage sleds 510 and interposer module 515 can be included in a sub-assembly or sub-enclosure 580 which is insertable into midplane 540 in a modular fashion.

Interconnect modules 520 each have an associated connector 561. Interconnect modules 520 also each have one or more cluster interconnect links 567, which in this example are PCIe links. Cluster interconnect links 567 are employed to interconnect unit enclosures between each other using PCIe links, such as interconnecting processing modules 530 plugged into other midplanes of other assemblies. Control modules 525 each have an associated connector 569. In some examples, ones of control modules 525 and interconnect modules 520 are included in the same module. Processing modules 530 each have an associated connector 562, which can be a similar type of connector as interposer module 515. In some examples, processing modules 530 each plug into more than one mating connector on midplane 540.

External interfaces module 535 each have an associated connector 568. External interfaces 535 provide external access to the storage contents of enclosure 500, such as for end user devices or external systems. Links 565 can comprise network links provided by external interfaces 535, which can comprises Ethernet, TCP/IP, Infiniband, iSCSI, or other external interfaces. In operation, external interfaces 535 each is communicatively coupled with an associated processing module, as pictured in FIG. 5. Links 565 can comprise links for communicating with external systems, such as management systems, end user devices, or other computing systems, including other enclosures similar to enclosure 500. External links 565 can comprise Ethernet, SFP+, or other links and connectors.

In some examples, enclosure 500 includes a chassis and midplane that can accommodate a flexible configuration and arrangement of sleds and associated circuit cards. Although FIG. 5 illustrates storage sleds mating on a first side of midplane 540 and various modules mating on a second side of midplane 540, it should be understood that other configurations are possible. Enclosure 500 can include a chassis to accommodate front-loaded or rear-loaded configurations of modules that contain four M.2 SSDs each, modules containing 2×HHHL cards (half-height half-length PCIe cards) that can comprise PCIe storage cards, PCIe network adaptors, or host bus adaptors, modules with 2×FHHL cards (full-height half-length PCIe cards) that can comprise graphics cards or graphics processing units (GPUs) modules with 1×PCIe cards (full-height full-length PCIe cards) that comprise processing modules, modules containing 4×2.5-inch PCIe SSDs, interconnect modules, interposer modules, and control modules, among others.

Additionally, power and associated power control signaling for the various sleds of enclosure 500 is provided by one or more power supply nodes 550 over associated links 563. Although power supply nodes 550 are shown as included in enclosure 500 in FIG. 5, it should be understood that power supply nodes 550 can instead be included in separate enclosures, such as separate 1U enclosures. Each power supply node 550 also includes power link 564 for receiving power from power sources, such as AC or DC input power. Additionally, power holdup circuitry can be included in holdup modules 551 which can deliver holdup power over links 574 responsive to power loss over link 564 or from a failure of power supply nodes 550.

Power holdup circuitry can be included on each sled or module. This power holdup circuitry can be used to provide interim power to the associated sled or module during power interruptions, such as when main input or system power is lost from a power source. Additionally, during use of holdup power, processing portions of each sled or module can be employed to selectively power down portions of each sled according to usage statistics, among other considerations. This holdup circuitry can provide enough power to commit in-flight write data during power interruptions or power loss events. These power interruption and power loss events can include loss of power from a power source, or can include removal of a sled or module from an associated socket or connector on midplane 540. The holdup circuitry can include capacitor arrays, super-capacitors, ultra-capacitors, batteries, fuel cells, flywheels, or other energy storage components, along with any associated power control, conversion, regulation, and monitoring circuitry.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A data storage system, comprising:
   a control system communicatively coupled to at least a storage drive over sideband communication interfaces different than a storage interface of the storage drive used to service data storage operations;
   during an initialization process for the storage drive, the control system configured to transfer initialization data to the storage drive over a first type of sideband communication interface and transfer further initialization data to at the storage drive over a second type of sideband communication interface responsive to the storage drive not responding to the initialization data over the first type of sideband communication interface.

2. The data storage system of claim 1, comprising:
   the control system configured to wait for a timeout period for the response to the initialization data from the storage drive over the first type of sideband communication interface before transferring the further initialization data to the storage drive over the second type of sideband communication interface.

3. The data storage system of claim 1, wherein a first one of the sideband communication interfaces comprises a point-to-point interface type coupling the control system individually to the storage drive, and wherein a second one of the sideband communication interfaces comprises a communication link type shared among the storage drive and one or more further storage drives.

4. The data storage system of claim 1, wherein the first one of the sideband communication interfaces comprises a universal asynchronous receiver/transmitter (UART) interface individually communicatively coupling the control system to the storage drive, and wherein the second one of sideband communication interfaces comprises a universal serial bus (USB) interface shared among the storage drive and the one or more further storage drives.

5. The data storage system of claim 1, comprising:
the storage drive associated with a non-volatile storage space that holds vendor product data (VPD) associated with at least the first type of sideband communication interface, with a portion of the VPD apportioned for storing status information for the storage drive.

6. The data storage system of claim 1, comprising:
during the initialization process for the storage drive, the control system configured to receive at least an identification key corresponding to the storage drive, wherein the identification key is unique to the storage drive within at least the data storage system.

7. The data storage system of claim 6, comprising:
during the initialization process for the storage drive, the control system configured to validate the identification key associated with the storage drive;
the control system configured to allow usage of the storage drive within the data storage system based at least on validation of the identification key.

8. The data storage system of claim 1, comprising:
the storage drive coupled over a Peripheral Component Interconnect Express (PCIe) fabric comprising the storage interface to communicatively couple the storage drive and at least one processing module that receives the data storage operations directed to the storage drive.

9. A method of operating a data storage system, the method comprising:
performing an initialization process for a storage drive to allow the storage drive to service data storage operations over a storage interface;
during the initialization process for the storage drive, transferring initialization data to the storage drive over a first type of sideband communication interface and transferring further initialization data to the storage drive over a second type of sideband communication interface responsive to the storage drive not responding to the initialization data over the first type of sideband communication interface.

10. The method of claim 9, comprising:
waiting for a timeout period for the response to the initialization data from the storage drive over the first type of sideband communication interface before transferring the further initialization data to the storage drive over the second type of sideband communication interface.

11. The method of claim 9, wherein a first one of the sideband communication interfaces comprises a point-to-point interface coupling a control system to the storage drive, and wherein a second one of the sideband communication interfaces comprises a communication link type shared among the storage drive and one or more further storage drives.

12. The method of claim 9, wherein the first one of the sideband communication interfaces comprises a universal asynchronous receiver/transmitter (UART) interface communicatively coupling the control system to the storage drive, and wherein the second one of the sideband communication interfaces comprises a universal serial bus (USB) interface shared among the storage drive and one or more further storage drives.

13. The method of claim 9, comprising:
retrieving status information for the storage drive over the first type of sideband communication interface, the status information stored within a portion of a vendor product data (VPD) associated with at least the first type of sideband communication interface.

14. The method of claim 9, comprising:
during the initialization process for the storage drive, receiving an identification key from the storage drive, the identification key unique to the storage drive within at least the data storage system.

15. The method of claim 14, comprising:
during the initialization process for the storage drive, validating the identification key associated with the storage drive, and allowing usage of the storage drive within the data storage system based at least on validation of the identification key.

16. The method of claim 9, comprising:
once the initialization process completes for the storage drive, then transferring the data storage operations to the storage drive over a Peripheral Component Interconnect Express (PCIe) fabric comprising the storage interface that communicatively couples the storage drive and at least one processing module.

17. A control system for a data storage system, comprising:
a control processor coupled to at least a storage drive over one or more sideband communication interfaces different than a storage interface of the storage drive;
during an initialization process, the control processor configured to transfer initialization data to the storage drive over a first sideband communication interface and wait for a response from the storage drive over the first sideband communication interface;
the control processor configured to determine if the first sideband communication interface is malfunctioning based on the response not being received from the storage drive over the first sideband communication interface, and responsively communicate further initialization data to the storage drive over a second sideband communication interface.

18. The control system of claim 17, comprising:
a non-volatile memory device configured to store a unique key associated with the storage drive;
during the initialization process, the control processor configured to validate storage drive for use in the data storage system using the unique key;
when the storage drive is determined to be invalid for use in the data storage system based on the unique key, then the control processor is configured to withhold initialization of the storage drive into the data storage system for handling of the storage transactions;
when the storage drive is determined to be valid for use in the data storage system based on the unique key, then the control processor is configured to initialize of the storage drive into the data storage system for handling of the storage transactions.

19. The control system of claim 17, comprising:
the control processor configured to wait for a timeout period for the response to the initialization data from the storage drive over the first sideband communication interface before transferring the further initialization data to the storage drive over the second sideband communication interface.

20. The control system of claim 17, wherein the first sideband communication interface comprises a universal asynchronous receiver/transmitter (UART) interface communicatively coupling the control processor to the storage drive, and wherein the second sideband communication interface comprises a universal serial bus (USB) interface shared among the storage drive and one or more further storage drives.

\* \* \* \* \*